United States Patent [19]

Broer et al.

[11] Patent Number: 5,136,679
[45] Date of Patent: * Aug. 4, 1992

[54] OPTICAL GLASS FIBRE HAVING A SYNTHETIC RESIN COATING AND CURABLE ELASTOMER FORMING MATERIAL

[75] Inventors: Dirk J. Broer; Petrus C. P. Bouten; Cornelis M. G. Jochem, all of Eindhoven, Netherlands

[73] Assignee: U.S. Philips Corp., New York, N.Y.

[*] Notice: The portion of the term of this patent subsequent to May 3, 2005 has been disclaimed.

[21] Appl. No.: 549,675

[22] Filed: Jun. 29, 1990

Related U.S. Application Data

[63] Continuation of Ser. No. 183,451, Apr. 14, 1988, abandoned, which is a continuation of Ser. No. 880,262, Jun. 30, 1986, abandoned.

[30] Foreign Application Priority Data

Jul. 23, 1985 [NL] Netherlands ............... 8502106

[51] Int. Cl.$^5$ ................. D02G 3/00; G02B 6/00
[52] U.S. Cl. ................. 385/128; 385/141; 385/145; 428/373; 428/375; 428/391; 428/392; 428/394
[58] Field of Search ............ 428/373, 391, 392, 394, 428/375; 350/96.34, 96.30; 427/54.1, 38, 163; 385/123, 141, 144, 145, 128

[56] References Cited

U.S. PATENT DOCUMENTS

| | | | |
|---|---|---|---|
| 4,125,644 | 11/1978 | Ketley et al. | 427/38 |
| 4,264,658 | 4/1981 | Tobias et al. | 427/54.1 |
| 4,482,204 | 11/1984 | Blyler, Jr. et al. | 427/163 |
| 4,741,596 | 5/1988 | Broer et al. | 428/392 |

*Primary Examiner*—Lorraine T. Kendell
*Attorney, Agent, or Firm*—Ernestine C. Bartlett

[57] ABSTRACT

The invention relates to an optical glass fibre 1 having a synthetic resin coating which consists of at least two layers 2 and 3 in which the first layer 2 is formed from an elastomer forming material which can be cured by exposure to actinic radiation, and in which the optical glass fibre exhibits a great tensile strength, a small risk of static fatigue fracture and a low ageing rate, owing to the fact that the synthetic resin composition comprises between 0.1 and 5% by weight of one or more phosphorus compounds of the following structural formula:

$$R_n-\overset{\overset{\displaystyle O}{\|}}{P}-(OH)_{3-n}$$

wherein n has a value of 1 or 2 and wherein R represents an organic group, preferably an organic group which co-reacts during curing of the elastomer forming material and is built into the polymeric network thus formed.

14 Claims, 1 Drawing Sheet

OPTICAL GLASS FIBRE HAVING A SYNTHETIC RESIN COATING AND CURABLE ELASTOMER FORMING MATERIAL

This is a continuation of application Ser. No. 183,451, filed Apr. 14, 1988 and now abandoned, which in turn is a continuation of Ser. No. 880,262, filed Jun. 30, 1986, and now abandoned.

FIELD OF THE INVENTION

The invention relates to an optical glass fibre having a synthetic resin coating, which comprises a glass fibre, a first layer of a synthetic rubber having a modulus of elasticity of from 1 to 10 MPa and a second layer of a synthetic resin having a modulus of elasticity exceeding 100 MPa, at least the first layer of synthetic rubber being formed from a synthetic resin composition which can be cured by actinic radiation.

The invention further relates to a curable elastomer forming material which can be made to cure by actinic radiation thereby forming a hydrophobic synthetic rubber.

An optical glass fibre is to be understood to mean herein a fibre of glass or quartz glass such as, for example, the fibres used for telecommunication purposes. Actinic radiation is to be understood to mean herein UV-light or high energy radiation, such as irradiation with electrons or ions.

BACKGROUND OF THE INVENTION

Such an optical glass fibre and curable synthetic resin composition are described in the Dutch Patent Application NL 8.401.981 which corresponds to U.S. Pat. No. 4,741,596 issued May 3, 1988 and commonly assigned herewith. The synthetic resin coating of the glass fibre, comprising a first soft layer and a second hard layer, serves to provide a glass fibre with a large strength and a low susceptibility to microbending. In this way, transmission losses caused by mechanical deformation of the glass fibre are kept low in the widest possible temperature range. The optical glass fibre may be further protected by enveloping it in additional layers of a thermoplastic synthetic resin or metal, in the form of a cladding or in the form of a tube in which the fibre can move freely. The use of a synthetic resin composition which can be cured by actinic radiation, makes it possible to envelop the glass fibre immediately after it has been formed, for example, by drawing from a preform, which drawing and coating processes can be carried out at a high rate.

In order to reduce the risk of breakage of the glass fibre in the cabling process and during arranging the cables in a telecommunications network, the aim is to manufacture glass fibres having a great tensile strength when used under dynamic circumstances. In order to improve the operational reliability of glass fibres used in telecommunications networks, the aim is to produce glass fibres whose properties depend to the smallest possible degree on varying ambient conditions, and which exhibit a very low ageing rate. If the glass fibre is constantly subjected to a mechanical load, the risk of fatigue fracture must be minimal. It has been found that the presence of water adversely affects all the said properties.

It is an object of the invention to improve optical fibres and curable synthetic resin compositions as described hereinabove, to such an extent that the coated glass fibre exhibits a greater tensile strength, a reduced risk of static fatigue fracture and a lower ageing rate, particularly in the presence of water.

SUMMARY OF THE INVENTION

This object is achieved in accordance with the invention by an optical glass fibre and a curable elastomer forming material as described hereinabove, which are further characterized in that the curable elastomer-forming material comprises a total amount of 0.1 to 5% by weight of one or more compounds selected from phosphorus compounds of the following structural formula:

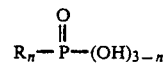

wherein n has a value of 1 or 2 and wherein R is an organic group. The organic group R may, for example via an oxygen atom or via a carbon atom, be chemically bound to the phosphorus atom, the structural formula representing a phosphate ester or a phosphonate, respectively.

The addition of the phosphorus compound in accordance with the invention results in an improved adhesion between the first layer of synthetic rubber and the glass fibre. Unlike customary adhesion primers such as, for example, silanes, the addition of the phosphorous compound does not result in a reduction of the curing rate and conversion degree at the outer surface of the synthetic rubber. The phosphorus compound in accordance with the invention has the particular advantage that an acid medium develops near the interface of the glass fibre and the first layer of synthetic rubber, as a result of which ageing of the glass or quartz glass is counteracted. In this way, thee desired greater strength and prolonged service life of the optical glass fibre coated with synthetic resin is obtained. However, for the purpose of making connections it remains possible to remove the synthetic resin coating at the end of the fibre in a simple way by stripping. Stripping can be carried out mechanically as well as by means of a solvent.

The curable elastomer forming material may additionally comprise other customary additions such as reactive monomers, light sensitive and light absorbing components, catalysts, initiators, lubricants, wetting agents, antioxidants and stabilizers.

European Patent Specification EP 0 101 091 describes curable synthetic resin compositions comprising phosphate esters, but the said synthetic resin compositions are not used for the manufacture of a synthetic resin coating which is to be applied to an optical glass fibre. Moreover, the said synthetic resin compositions are not cured by actinic radiation, but by the phosphate ester acting as a curing agent.

In order to preclude migration of the phosphorus compound in the synthetic resin coating, which would adversely affect the service life of the optical glass fibre, it is advantageous for R in the above-described optical glass fibre and curable elastomer forming material in accordance with the invention to be an organic group which co-reacts during curing of the curable synthetic resin composition and is built into the polymeric network thus formed.

The phosphorus compound may be used in accordance with the invention together with curable synthetic resin compositions which are commonly used in the art and whose chief constituent is, for example, polysiloxane, polybutadiene, polyether urethane acrylate, polyester urethane acrylate, polysiloxane acrylate, a polymer formed by reactions between monomers comprising vinyl groups and silyl groups, or a mixture of such polymers or a copolymer.

In a preferred embodiment of the optical glass fibre and the curable elastomer forming material in accordance with the invention, the curable elastomer forming material comprises a polyurethane acrylate and R is an organic group which comprises at least one acrylate ester group. Preferably, the group R further consists of a short alkyl chain, such as an ethyl- or propyl-group. The group R may also contain other unsaturated groups such as vinylgroups or vinyl groups attached to aromatic groups. Suitable curable elastomer forming materials of this type are described in, for example, the aforementioned Dutch Patent Application NL 8 401 981.

As disclosed in said Dutch Application, a suitable curable elastomer-forming material is a composition containing an oligomeric urethane acrylate, the oligomeric urethane acrylate being a polyurethane acrylate having a number-averaged molecular weight in excess of 3000, of the following structural formula:

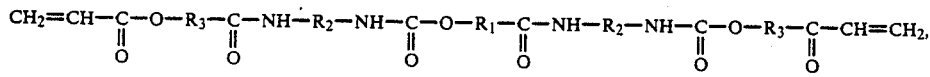

wherein $R_1$ is selected from the group formed by polyether chains and polyester chains having a number-averaged molecular weight in excess of 2500, wherein $R_2$ is a bivalent radical of a disocyanate, and wherein $R_3$ is a bivalent radical of a dihydric alcohol.

For example: $R_1$ may be selected from the group of

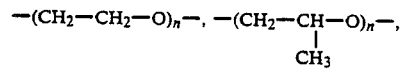

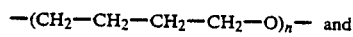

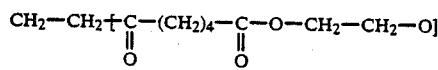

wherein the average value of n exceeds 90 and wherein the average value of m exceeds 30;

$R_2$ may be selected from the group of

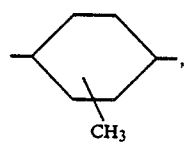

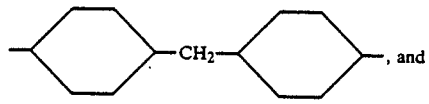

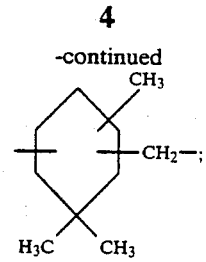

and $R_3$ may be selected from the group of $-(CH_2-CH_2-O)_p-$ and

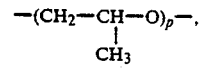

wherein p is at least 1.

In the said Patent Application, very good results are obtained with a phosphorus compound in which R is a 2-acryloxy ethylate group.

To further improve wetting of the glass fibre by the curable elastomer-forming material and to facilitate curing at the outer surface of the synthetic rubber, it is efficient for the curable elastomer forming material to comprise up to 2% by weight of a poly(dimethyl siloxane-co-ethyleneoxide)acrylate.

Dependent upon the composition of the selected curable elastomer forming material, other suitable co-reacting groups, such as methacrylate groups and vinyl groups, may also be used in the phosphorus compound.

The invention will now be explained in more detail with reference to examples of embodiments and examples for comparison and with reference to a drawing, in which

DETAILED DESCRIPTION OF THE PREFERRED EMBODIMENTS

Example 1

Figure 1:
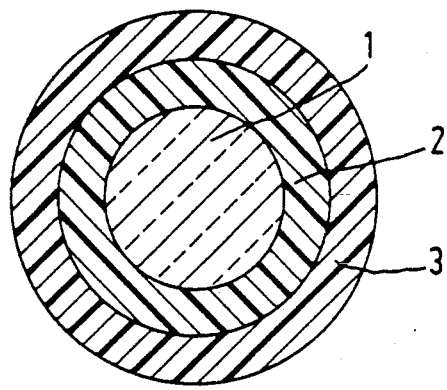
FIG. 1 is a cross-sectional view of an optical glass fibre in accordance with the invention.

In known manner, a glass fibre is formed by drawing from a preform. The fibre comprises a core glass and a cladding glass having different refractive indices. Alternately, a fibre may be used whose refractive index changes gradually from the centre outwards. Additionally, instead of a fibre drawn from a preform, a fibre may be used which is formed by means of the double-crucible method. The glass fibre 1 shown in FIG. 1 is of circular cross-section (diameter 125 μm) but may be of any other cross-section, for example, it may be elliptical.

Immediately after the glass fibre has been formed, a layer of a curable elastomer-forming material is applied to said fibre and subsequently the elastomer-forming material is cured to form a layer of a synthetic rubber 2 having a thickness of 30 μm. The layer is made to cure by exposing it to radiation for, at the most, 0.5 s using a high-pressure mercury vapour lamp which produces UV-light having wavelengths between 200 and 400 nm and an intensity of 0.6W/cm², measured on the layer of elastomer forming material. The elastomer forming material may also be cured otherwise, for example, by exposing it to electrons using an Electrocurtain apparatus (marketed by Energy Sciences Inc., Woburn, Mass.).

Figure 2:
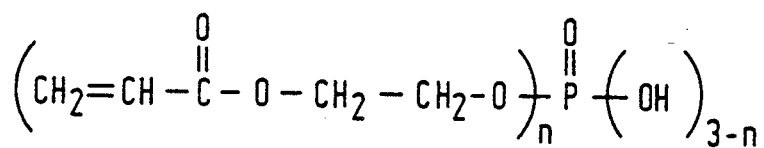
FIG. 2 shows the structural formula of mono-2-acryloxy ethylphosphate and di-2-acryloxy ethylphosphate (in which n=1 and n=2, respectively)
Figure 3:
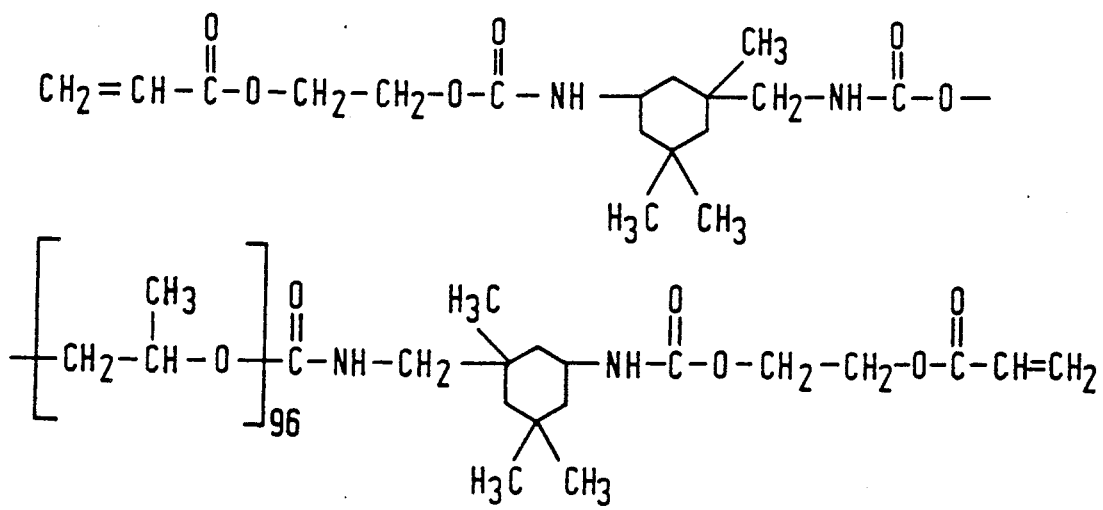
FIG. 3 is the structural formula of a polyether urethane acrylate.

The first layer of synthetic rubber 2 is formed from a curable elastomer forming material whose main constituent (76% by weight) is a polyether urethane acrylate as described in the Dutch Patent Application NL 8401981 in U.S. Pat. No. 4,741,596 and depicted in FIG. 3. The curable synthetic resin composition further comprises the reactive monomers 2-phenoxy-ethyl acrylate (14% by weight) and hexane diol diacrylate (2% by weight) and the light sensitive initiators 2,2-dimethoxy-2-phenyl-acetophenone (2% by weight), 2,2-dimethyl-2-hydroxy-acetophenone (2% by weight) and 2-oxybenzophene-2-ethoxy-ethyl-acetophenone (2% by weight). The curable synthetic resin composition finally comprises 2% by weight of a mixture of mono-2-acryloxy ethylphosphate and di-2-acryloxy ethylphosphate, see FIG. 2 (n=1 and n=2, respectively), the mole ratio being 1:1.

Subsequently, a second 30μm thick synthetic resin layer 3 is applied to the fibre, for example by coating the fibre with a curable synthetic resin composition which is made to cure by exposure to UV-light. A commercially available synthetic resin composition comprising a light-sensitive initiator which is suitable for the second layer is DeSolite 042 ® marketed by DeSoto Inc. After it has been cured, the said material has a modulus of elasticity of approximately 400 MPa.

If desired, a cladding of a thermoplastic synthetic resin, for example nylon, may be provided around the optical fibre (cladding is not shown in FIG. 1). The cladding which envelops the synthetic resin coated optical fibre may be in direct contact with the said fibre. However, the cladding may also have the form of a tube in which the optical fibre can move freely, for example in silicone oil.

The fibre thus formed is subjected to a number of tests. The dynamic breaking strength is measured by means of a bending fracture apparatus. The strength is indicated by the risk of breakage, as described by P. W. France et. al, J. Mater. Sci. 15, 825–830 (1980). The outcome is listed in Table 1 in which the fibre of the invention is compared with a fibre which is produced in the same way, but which does not comprise the phosphorous compound and the other constituents are present in proportionally larger amounts.

TABLE 1

| risk of breakage at an elongation of: | in accordance with the invention | for comparison |
| --- | --- | --- |
| 5.8% | <0.1% | 1% |
| 6.2% | <0.1% | 99% |
| 6.8% | 3% | >99.9% |
| 7.2% | 99% | >99.9% |

Table 1 shows that the fibre in accordance with the invention is stronger than the fibre for comparison.

The fibre in accordance with the invention and the fibre for comparison are subjected to an accelerated ageing process by immersing the fibres for a predetermined time in water of 60° C., after which the dynamic breaking strength is measured. Subsequently, the fibres are dried and conditioned at a relative humidity of 65% after which the dynamic breaking strength is measured again. The results are listed in Table 2 which tabulates the elongation at which the risk of breakage is 63% as a function of the time during which the fibres are immersed in water of 60° C.

TABLE 2

|  | in accordance with the invention | for comparison |
| --- | --- | --- |
| 0 days | 7.0% | 6.1% |
| 2 days, wet | 6.5% | 5.3% |
| 2 days, dry | 6.9% | 5.5% |
| 7 days, wet | 6.5% | 4.9% |
| 7 days, dry | 6.9% | 5.1% |
| 38 days, wet | 6.4% | 4.8% |
| 38 days, dry | 6.9% | 4.9% |
| 305 days, wet | 6.2% | 4.4% |
| 305 days, dry | 6.5% | 4.5% |

Also after ageing, in water, the fibre in accordance with the invention proves to be stronger than the fibre which does not comprise the phosphorous compound. Moreover, it has been found that in contrast to the fibre used for comparison, the fibre of the invention almost completely regains its original strength after drying.

To carry out a static fatigue test, the fibres are wound on a mandrel having a diameter of 3.4 mm and, subsequently, while being subjected to a mechanical stress (elongation 3.42%) they are immersed in water. In the fibre for comparison, the first fracture occurs after 10 to 18 minutes and after 85 to 93 minutes 63% of the fibre windings are broken. In the fibre in accordance with the invention, the first fracture does not occur until after more than 1000 minutes.

Additional experiments have shown that adding the phosphorus compound has a positive effect when used in an amount of at least 0.1% by weight. Amounts in excess of 5% by weight adversely affect the properties of the synthetic rubber.

In order to further improve the wetting of the glass fibre and the curing at the surface, poly (dimethyl siloxane co-ethyleneoxide) acrylate may be added, for example, in an amount of 1% by weight. In the case of synthetic resin compositions in accordance with the invention, the surface curing-time is thereby accelerated by approximately a factor of 10.

EMBODIMENTS 2–5 AND EXAMPLES FOR COMPARISON VI–XV

The curable synthetic resin compositions used in the present examples comprise polypropyleneoxide urethane acrylates of different molecular weight as the main constituent (Table 3 lists the number-average molecular weight). Other suitable polymers are, for example, DeSolite 039 ® and DeSolite 073 ® available commercially from DeSoto Inc.

Reactive monomers are used to influence the viscosity and the curing rate. The curable elastomer forming materials are applied to the glass fibre, in accordance with the present examples, at a temperature of 45° C. at which the viscosity amounts to approximately 2 Pa.s. The reactive monomers used are 2-phenoxy-ethyl acrylate (PEA), 1,6-hexane dioldiacrylate (HDDA), 2-(2-ethoxy ethoxy) ethyl acrylate (EEEA) and tripropylene glycol diacrylate (TPGDA). Trimethylol propane triacrylate can also suitably be used in curable synthetic resin compositions in accordance with the invention.

In the present examples, 2,2-dimethoxy-2-phenyl acetophenone is used as a light sensitive initiator.

The phosphorous compound used is a mixture in the ratio of 1:1 of mono-2-acryloxy ethylphosphate and di-2-acryloxy ethylphosphate. An adhesive which is alternatively used by way of example is γ-methacryloxypropyl trimethoxysilone.

Curable synthetic resin compositions as listed in Table 3 are used, as indicated in example 1, for the manufacture of optical fibres. The examples listed in Table 3 can be categorized as examples in accordance with the invention: Example 2 to 5, and examples for comparison: Examples VI to XV.

and said glass fiber selected from phophorous compounds of the following structural formula:

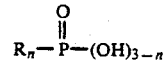

wherein n has a value of 1 or 2 and wherein R is an organic group.

2. An optical glass fibre as claimed in claim 1 wherein R is an organic group which coreacts during curing of the curable elastomer-forming material and is built into the polymeric network thus formed.

TABLE 3

| | composition in % by weight: | | | | | | | | | | | | | |
|---|---|---|---|---|---|---|---|---|---|---|---|---|---|---|
| | in accordance with the invention | | | | for comparison | | | | | | | | | |
| | | | | | polypropyleneoxide urethane acrylate: | | | | | | | | | |
| | 2 | 3 | 4 | 5 | VI | VII | VIII | IX | X | XI | XII | XIII | XIV | XV |
| MW = 4650 | 81 | 76 | 0 | 0 | 81 | 96 | 77 | 77 | 77 | 77 | 0 | 0 | 0 | 0 |
| MW = 9500 | 0 | 0 | 69 | 0 | 0 | 0 | 0 | 0 | 0 | 0 | 96 | 77 | 77 | 0 |
| MW = 3400 | 0 | 0 | 0 | 72 | 0 | 0 | 0 | 0 | 0 | 0 | 0 | 0 | 0 | 96 |
| PEA | 13 | 10 | 14 | 0 | 13 | 0 | 19 | 15 | 0 | 0 | 0 | 19 | 0 | 0 |
| HDDA | 0 | 0 | 0 | 0 | 0 | 0 | 0 | 2 | 0 | 0 | 0 | 0 | 0 | 0 |
| EEEA | 0 | 0 | 0 | 12 | 0 | 0 | 0 | 0 | 19 | 0 | 0 | 0 | 19 | 0 |
| TPGDA | 0 | 10 | 14 | 12 | 0 | 0 | 0 | 0 | 0 | 19 | 0 | 0 | 0 | 0 |
| Initiator | 4 | 2 | 2 | 2 | 4 | 4 | 4 | 6 | 4 | 4 | 4 | 4 | 4 | 4 |
| phosphorus compound | 2 | 2 | 1 | 2 | 0 | 0 | 0 | 0 | 0 | 0 | 0 | 0 | 0 | 0 |
| γ-methacryloxy propyl trimethoxysilane | 0 | 0 | 0 | 0 | 2 | 0 | 0 | 0 | 0 | 0 | 0 | 0 | 0 | 0 |
| modulus of elasticity (MPa) | — | 1.9 | 2.3 | 4.7 | — | 2.5 | 3.4 | — | 2.5 | 1.6 | 1.4 | 1.5 | 1.3 | 3.2 |
| Tg (°C.) | — | −52 | −58 | −61 | — | −49 | −53 | — | −53 | −49 | −59 | −56 | −59 | −55 |
| elongation at breakage | — | — | 7.0 | 7.0 | — | — | — | 6.5 | — | — | — | — | — | — |

Table 3 lists the modulus of elasticity at 25° C. in MPa, the glass transition temperature $T_g$ in °C. and the elogation at breakage in % (bending fracture test, see example 1) of the synthetic rubber which is formed by curing the synthetic resin composition.

Comparing the examples 2 and VI shows that the use of the silane compound as an adhesive results in an improved adhesion between the first synthetic resin coating and the (quartz) glass fibre; this is also true for the use of the phosphorus compound in accordance with the invention. However, the silane compound adversely affects the curing process particularly at the outer surface of the synthetic rubber; nor does it have the required effect on the service life of the optical fibre.

The fibres manufactured by means of the synthetic resin compositions in accordance with examples 3 to 5 have proved to be stronger and to be better resistant to ageing than the fibres of the examples for comparison VI to XV.

3. An optical glass fibre as claimed in claim 2, wherein the curable elastomer-forming material comprises a polyurethane acrylate and R is an organic group which comprises at least one acrylate ester group.

4. An optical glass fibre as claimed in claim 3, wherein R is a 2-acryloxy ethylate group.

5. An optical glass fibre as claimed in claim 1, wherein the curable elastomer-forming material comprises up to 2% by weight of a poly(dimethyl siloxane-co-ethyleneoxide) acrylate.

6. An optical glass fiber of improved strength having: (1) a first coating layer of a synthetic rubber having a modulus of elasticity of from 1 to 10 MPa formed from a curable elastomer-forming material which comprises an oligomeric urethane acrylate and a monomeric acrylate, the oligomeric urethane acrylate being polyurethane acrylate having a number-averaged molecular weight in excess of 3000, of the following structural formula:

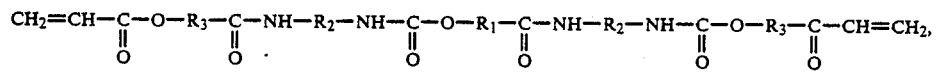

What is claimed is:

1. An optical glass fiber of improved strength having: (1) a first coating layer of a synthetic rubber having a modulus of elasticity of from 1 to 10 MPa and (2) a second coating layer of a synthetic resin having a modulus of elasticity exceeding 100 MPa, at least the first coating layer of synthetic rubber being formed from an elastomer-forming material comprising a polyurethane acrylate curable by actinic radiation, and a total amount of 0.1 to 5% by weight of one or more compounds effective to improve adhesion between said first layer wherein $R_1$ is selected from the group formed by polyether chains and polyester chains having a number-averaged molecular weight in excess of 2500, wherein $R_2$ is a bivalent radical of a disocyanate and wherein $R_3$ is a bivalent radical of a dihydric alcohol, (2) a second coating of a synthetic resin having a modulus of elasticity exceeding 100 MPa; at least the first coating layer being cured by exposure to actinic radiation; said elastomer forming material containing from about 0.1 to 5% by weight of one or more phosphorous compounds effective to improve adhesion between said first layer and said glass fiber selected from compounds having the following general structural formula:

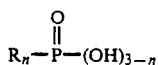

wherein n is an integer of 1 or 2 and R is an organo group.

7. An optical glass fiber as claimed in claim 6 wherein in said polyurethane acrylate formula $R_1$ is selected from the group of

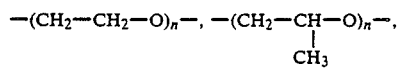

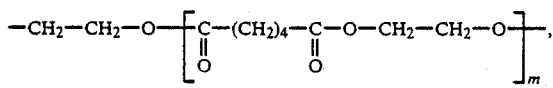

wherein the average value of n exceeds 90 and wherein the average value of m exceeds 30.

8. An optical glass fiber as claimed in claim 7 wherein $R_2$ is selected from the group of

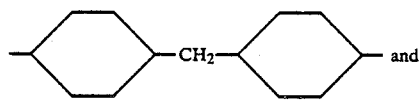

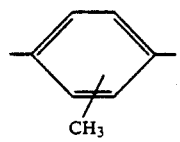

9. An optical glass fiber as claimed in claim 7 wherein $R_2$ is selected from the group of

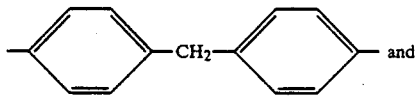

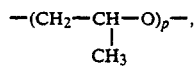

10. An optical glass fiber as claimed in claim 6 wherein $R_3$ is selected from the group of —$(CH_2$—$CH_2$—$O)_p$— and $$-(CH_2-CH-O)_p-,$$
$$\phantom{-(CH_2-}CH_3$$

wherein p is at least 1.

11. An optical glass fiber as claimed in claim 6 wherein in the phosphorus compound structural formula R is selected from the group of acrylate ester, alkyl, vinyl and vinyl-aromatic groups, at least one R group being an acrylate ester group.

12. An optical glass fiber as claimed in claim 6 wherein said phosphorus compound is selected from the group of mono-2-acryloxy ethyl phosphate, di-2-acryloxyethyl phosphate and mixtures thereof.

13. An optical glass fiber as claimed in claim 12 wherein said curable elastomer-forming material comprises a polyetherurethane acrylate.

14. An optical glass fiber as claimed in claim 13 wherein said curable elastomer-forming material further comprises up to 2% by weight of a poly (dimethyl siloxane co-ethylene oxide) acrylate.

* * * * *